July 7, 1925.  
E. F. GRUNEWALD  
ADJUSTING DEVICE  
Filed Nov. 26, 1923
1,544,742
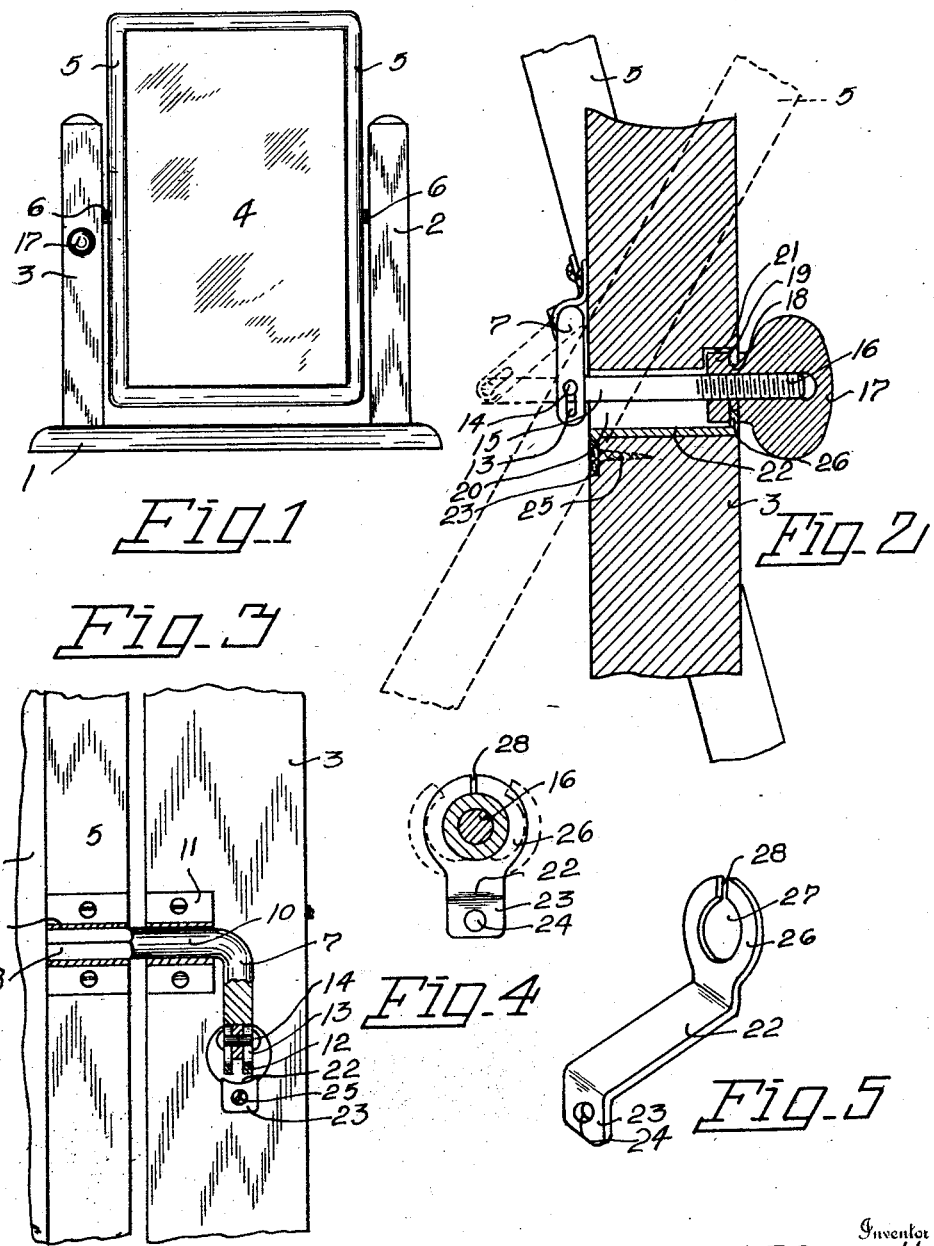
Inventor  
Edward F. Grunewald
By Herbert E. Smith  
Attorney Patented July 7, 1925.

1,544,742

UNITED STATES PATENT OFFICE.

EDWARD F. GRUNEWALD, OF KAMIAH, IDAHO.

ADJUSTING DEVICE.

Application filed November 26, 1923. Serial No. 676,984.

*To all whom it may concern:*

Be it known that I, EDWARD F. GRUNEWALD, a citizen of the United States, residing at Kamiah, Lewis County, and State of Idaho, have invented certain new and useful Improvements in Adjusting Devices, of which the following is a specification.

My present invention relates to improvements in adjusting devices of the type utilizing a screw bolt and crank arm or bracket arm and adapted especially for use in connection with adjustable mirrors which may be pivotally supported upon various articles of furniture, and equally well adapted for use in connection with adjustable hinged transoms for doors and windows, and other articles which are pivotally supported and adjustable, with relation to their supports, to different positions for use as required.

In the specific embodiment of my invention herein illustrated I have shown its adaptation to an adjustable mirror and depicted the details of construction including a novel supporting bracket for the adjusting bolt, which bracket is simple in construction; may be manufactured at comparatively low cost, and in combination with the adjusting elements of the device, may with facility and convenience be assembled and attached for use in connection with mirrors, picture frames and other articles having supporting pivots as above indicated.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view in front elevation of an adjustable mirror equipped with the device of my invention.

Figure 2 is an enlarged sectional detail view through a supporting post or frame for the mirror showing different positions of adjustment.

Figure 3 is a sectional detail view showing one of the pivot supports for the mirror and the adjusting bolt and its support.

Figure 4 is a detail view in cross section through the adjusting bolt and its adjusting knob or nut showing the relation of the bolt supporting bracket.

Figure 5 is a perspective view of the supporting bracket for the bolt.

In Figure 1 of the drawings I have illustrated as an exemplification of the use of my invention a mirror frame, picture frame, or other similar article, which has a supporting base 1 and upright, spaced posts 2 and 3 between which the panel is pivoted. The pivoted panel may be a mirror as 4 with side bars 5, 5, forming part of its enclosing frame, and at 6 the mirror is hinged or pivoted in any suitable manner to the post 2.

The other or second pivot of the mirror involves my invention, and in connection therewith I utilize an angle hinge or pivot bar 7 provided with a squared end 8 disposed horizontally and fixed within the complementary fastening clip 9 secured as by screws to the side bar 5 of the mirror. The angle bar is fashioned with a round journal portion 10 which is supported in a bearing clip 11 secured as by screws to the post 3 and alined with the slip 9.

The angular pivot bar 7 is provided with a forked end 12 in which are provided slots 13 for a headed pin 14 for connection with the angularly disposed adjusting bolt 15, which bolt has a threaded end 16. A complementary threaded knob 17 is carried by the bolt and is fashioned with an annular groove 18 and a round or disk shaped head 19 of greater diameter than the diameter of the annular groove.

In assembling the adjusting device for use an opening 20 is first bored in the post 3, said opening extending horizontally therethrough from front to rear, and at its front end a recess 21 is enlarged from this bore and countersunk below the front face of the post. The adjusting bolt is passed through this opening, and the head of the knob is located in the countersunk recess. The adjusting bolt is supported in its bolt opening by means of a novel bracket comprising a metallic plate 22 approximating the length of the opening 20 and resting on the lower wall of the opening. At one end of this plate is fashioned with a downturned flange 23 that is perforated at 24 for a fastening screw 25, and at its front end an integral upturned flange or head 26 is provided on the plate. These flanges 23 and 26 may be countersunk with respect to the front and rear faces of the post 3 to provide a neat finish for the construction.

The supporting bracket is stamped or otherwise fashioned from metal adapted for this purpose and the oppositely extending flanges 23 and 26 are disposed at right angles to the plate 22 in order that the bracket may be located in desired position with either of these flanges at the upper side.

The angular head or flange 26 is provided with an opening 27 therein to form a collar, and this collar is split as at 28. The split collar is designed to engage the annular groove of the knob, and as the bracket and its collar are fixed, it will be apparent that the knob is retained in position, but may be turned on the bolt to push the latter in or pull it out for the purpose of adjusting the mirror as indicated in dotted lines and full lines in Figure 2. The head or disk 19 of the knob is accommodated in the recess 21 and the split collar engaging the annular groove between the knob and its head forms a bearing ring for the knob. The bearing ring fits snugly within the open front of the recess 21 to close the latter, and as the knob 17 is larger than the bearing ring the former covers the latter thus providing a neat and unobtrusive appearance for the adjusting device, all parts of which, except the knob, are invisible from the front of the mirror.

The bracket is made of suitable metal that will permit opening of the bearing ring, as indicated in dotted lines Figure 4, in order that the ring may be clasped around the annular groove, and after being placed in the groove the split ring is closed, as in Figure 5, to encircle the groove and retain the knob in place. In assembling the parts after the bolt is projected through the opening 20 from rear to front, the knob with its connected bracket is placed in position by first introducing the bracket through the opening from front to rear where it is secured by the screw 25, then the knob may be adjusted by turning on the bolt to bring the mirror to desired position. The split collar thus forms a thrust bearing for the knob and the latter forms a non-traveling nut on its bolt 15. The slot and pin connection between the bolt and the angular bar 7 permits the required movement of these parts and the angular bar is swung as a pivot in its bearing 11 to swing the mirror, as indicated in dotted lines Figure 2.

As thus constructed it will be apparent that mirrors, picture frames, transoms, and numerous other pivoted or hinged articles may be manufactured with the adjusting device as an element in their construction. Other similar devices may be equipped with the adjusting device and converted for use therewith by first boring the mortise or opening in the post or supporting frame for the introduction of the bracket and knob, and substituting for the original plain pivot or hinge the angular pivot bar and its two clips. This may be done with facility and convenience and without the necessity for skilled labor.

Having thus fully described my invention, what I claim as new and desire to secure by Letters Patent is—

The combination with a pivoted mirror and its support having an opening therethrough, of a bolt in said opening and an operative connection between said bolt and mirror, an invisible supporting bracket fixed in said opening and having a split collar forming a thrust-bearing ring, and an adjusting knob threaded on the bolt having a bearing in said ring to form a non-traveling nut.

In testimony whereof I affix my signature.

EDWARD F. GRUNEWALD.